Nov. 23, 1926.

W. W. SLOANE

POWER SHOVEL

Filed April 30, 1926

Inventor
William W. Sloane
Clarence F. Poole
Attorney

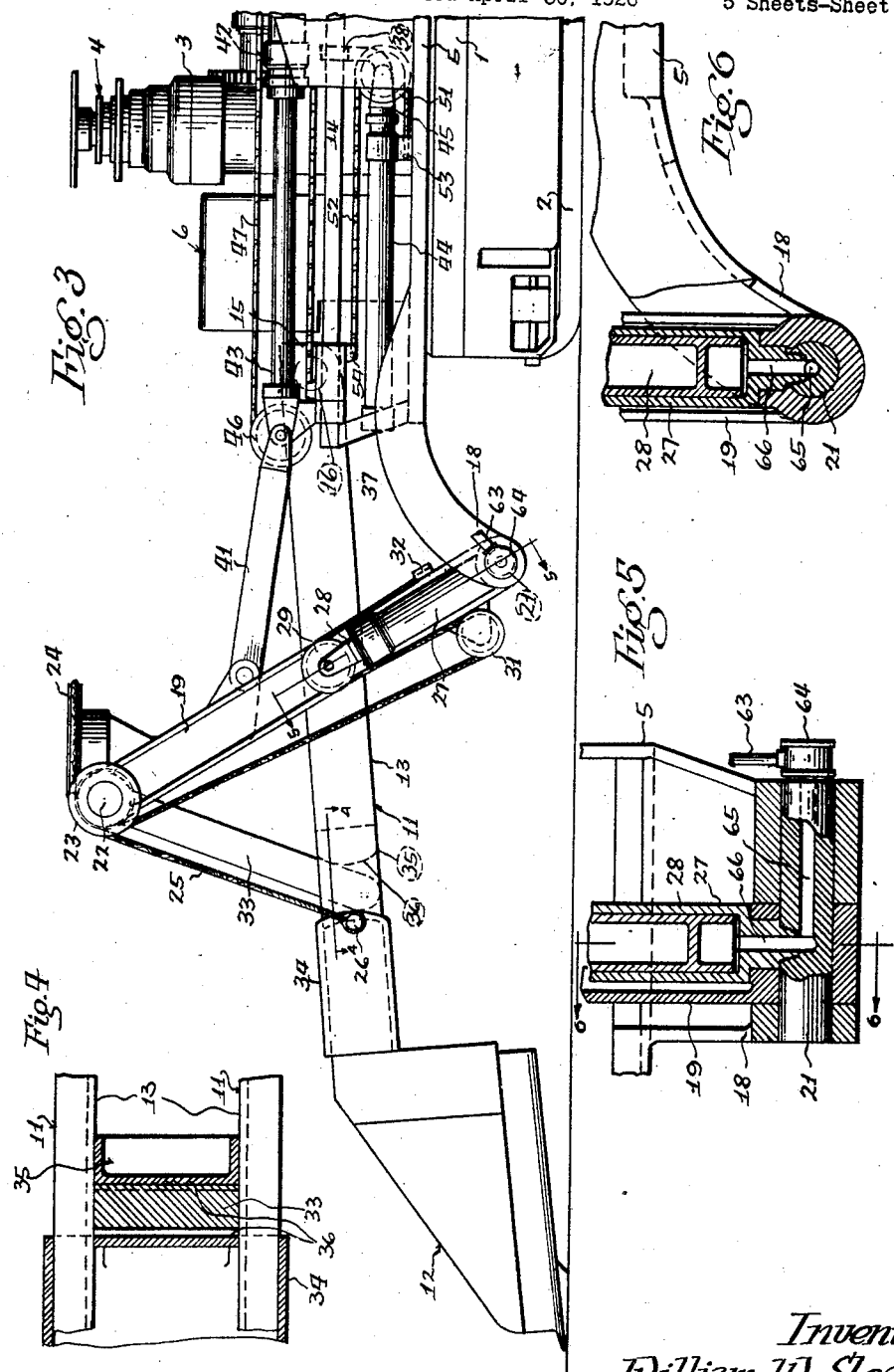

Nov. 23, 1926.

W. W. SLOANE

POWER SHOVEL

Filed April 30, 1926

Inventor
William W. Sloane
by Clarence F. Poole
Attorney

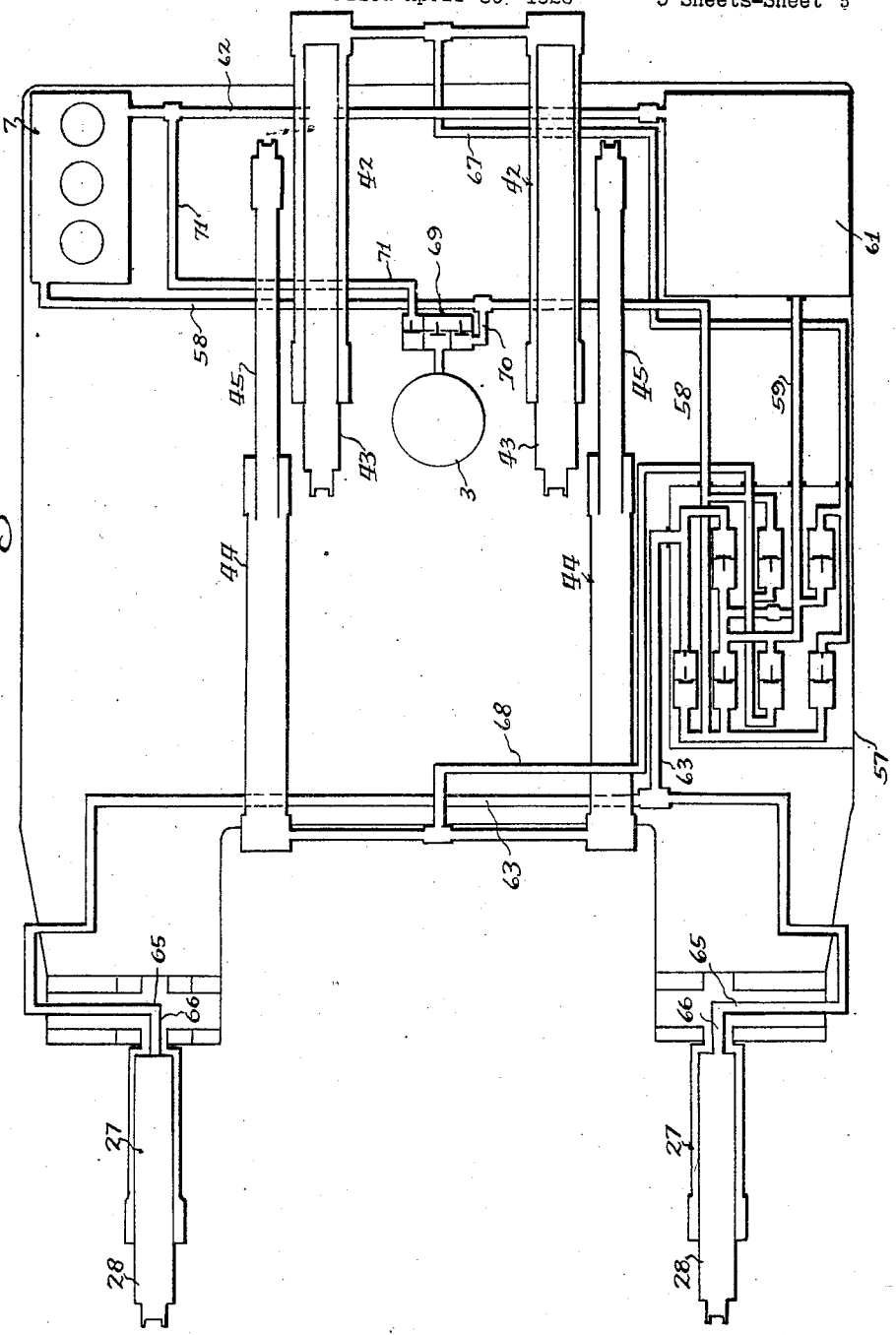

Patented Nov. 23, 1926.

1,607,852

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

POWER SHOVEL.

Application filed April 30, 1926. Serial No. 105,628.

This invention relates to power shovels for use in confined spaces such as in mines, although not limited to this use alone. Specifically, the invention relates to the longitudinally movable scoop carrying beam type of power shovel and has for its principal object the provision of a structure whereby the length required for the longitudinal operation of the scoop carrying beam is relatively short, all with a view toward general all around convenience and efficiency, particularly where used in confined spaces.

Referring now to the drawings:

Figure 3 is an enlarged partial side elevation of the machine showing the parts in different positions from those in which they are shown in Figure 1;

Figure 4 is an enlarged partial sectional view on the line 4—4 of Figure 3;

Figure 5 is an enlarged partial section on the line 5—5 of Figure 3;

Figure 6 is a partial section on the line 6—6 of Figure 5;

Figure 9 is a diagrammatic view of the fluid pressure system of the machine and related parts.

Like numerals refer to like parts throughout the several figures.

Figure 1:
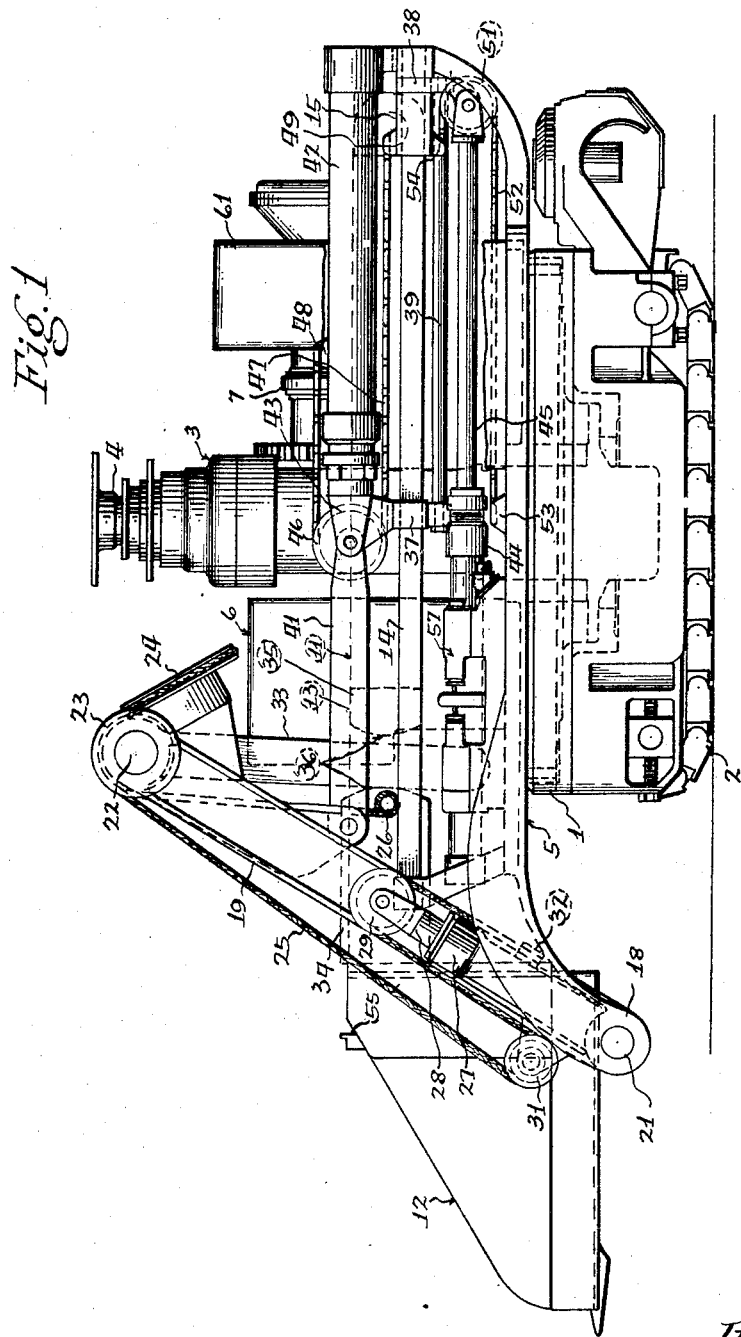
Figure 1 is a side elevation of a power shovel embodying one form of my invention.

In the drawings 1 designates a base frame which is carried on continuous tread means 2 of usual construction adapted for the propulsion of the shovel.

Mounted centrally upon the base 1 is a vertically disposed cylinder 3 containing a piston 4, arranged so that the piston may be raised by fluid pressure to engage a fixed part, such as a roof, thus forming a holding jack for the machine while it is in operation.

A turntable or rotatable frame 5 is carried by the base 1 for movement axially about the vertically disposed cylinder 3, and this turntable carries the major portion of the operating mechanism. See Figures 1 and 2.

An electric motor 6 and a fluid pressure pump 7, driven thereby by a reduction gear transmission mechanism 8, are mounted on the turntable, and are disposed in horizontal longitudinal arrangement along one side thereof. The turntable is actuated about its axis in either direction by the motor 6 through manually controlled oppositely acting clutch devices 9 associated with the transmission mechanism 8.

Figure 2:
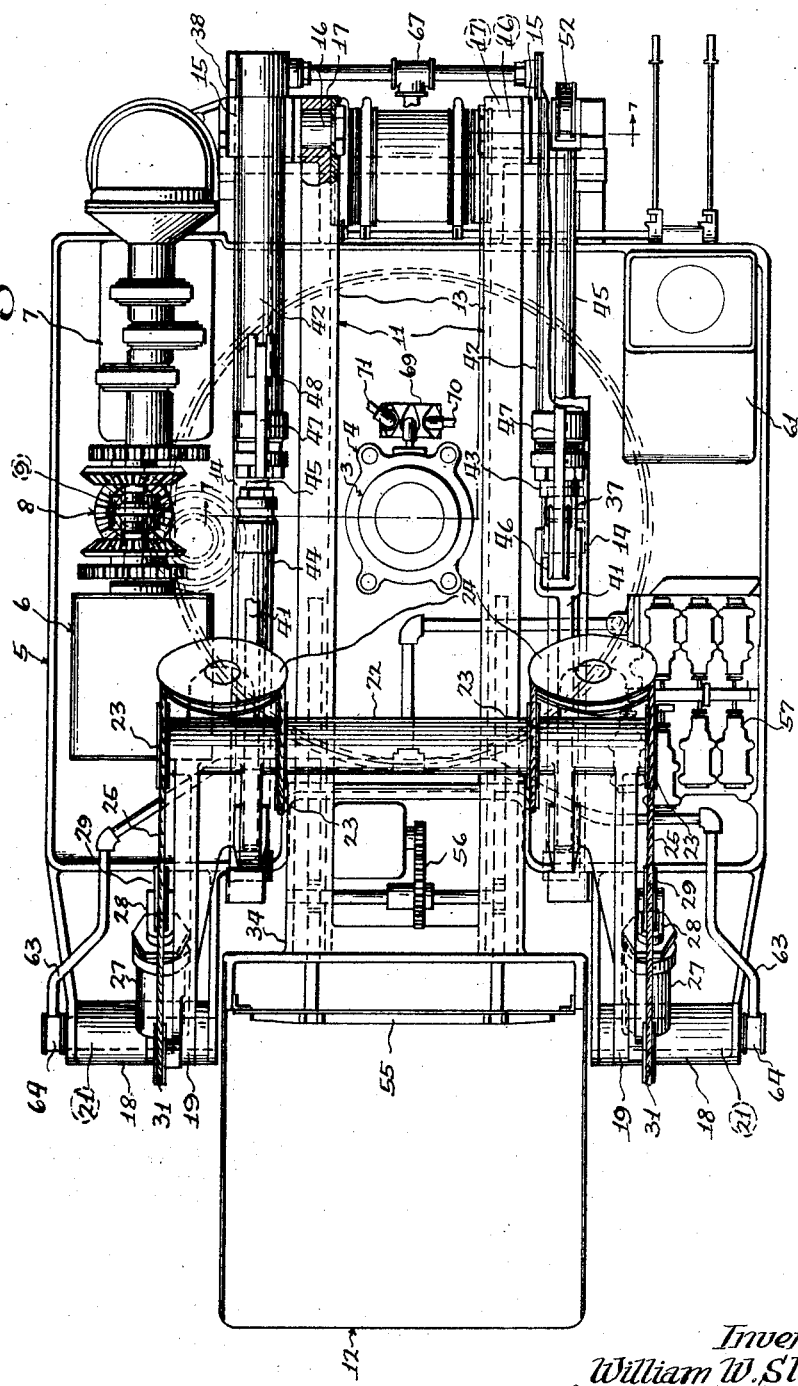
Figure 2 is a plan view of the machine illustrated in Figure 1 with parts broken away and sectioned.
Figure 7:
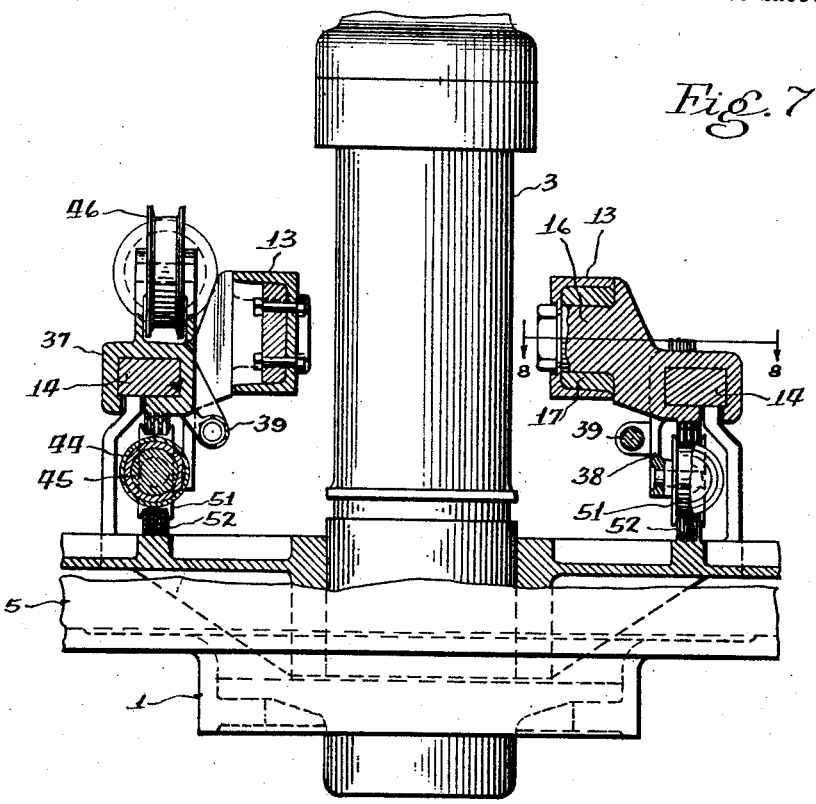
Figure 7 is an enlarged partial section on the line 7—7 of Figure 2.
Figure 8:
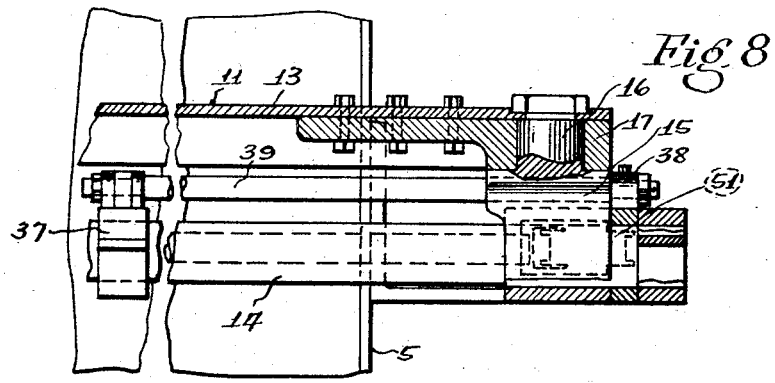
Figure 8 is a partial section on the line 8—8 of Figure 7.

A beam 11 carries a scoop 12 at its front end and comprises two laterally spaced outwardly facing parallel channel members 13. A pair of horizontal parallel bearing members 14, disposed on respective sides of the cylinder 3, are mounted on the turntable 5. See Figures 1, 7 and 8. A pair of bearing members 15 are mounted on respective bearing members 14 for movement therealong. The bearing members 14 extend longitudinally of the beam 11 and the rear end of the beam is mounted on the bearing members 15 for vertical pivotal movement by means of studs 16 on the bearing members 15 journaled in coaxial bearings 17 secured to respective channel members 13 within the enclosures thereof. See Figures 2, 7 and 8. Thus is the beam 11 carried at its rear end on the turntable for horizontal longitudinal and vertical pivotal movement, the channel members 13 being disposed on respective sides of the cylinder 3 in the rearward positions of the beam as shown in Figure 2.

The turntable 5 is provided at its front end with a pair of laterally spaced forwardly projecting extensions 18, and a pair of arms 19 have their lower ends pivotally mounted on respective extensions 18 on a horizontal axis transverse to the beam 11 by means of studs 21 extending through bores in respective of said arms and journaled in bores of respective of said extensions. See Figures 1, 5 and 6. The arms 19 are disposed on respective sides of the beam 11, and they and the extensions 18 are so spaced laterally that the scoop 12 may lie therebetween when in its rear position as shown in Figures 1 and 2.

The upper ends of the arms 19 are connected by a horizontal shaft 22 disposed transverse to the beam 11 and above the same, the shaft extending through bored hubs of the arms and secured therein. Four sheaves 23 are mounted for rotation on the shaft 22 and are disposed at respective sides of respective arms 19, and two sheaves 24 are mounted for rotation on respective arms 19 on axes between the sheaves 23 at the sides of respective arms and transverse to the axis thereof. A pair of cables 25 are secured to the beam 11 adjacent the front end thereof, as designated at 26, and extending from the beam they are trained first over respective of the inner sheaves 23, then about a respective sheave 24 and then over respective of the outer sheaves 23 for suspending the beam 11 from the upper ends of the arm 19 for vertical adjustment.

A pair of hydraulic lifting cylinders 27 are carried with respective arms 19 on the outsides thereof adjacent the lower ends of these arms and are arranged longitudinally of the arms with plungers 28 engaged therein and operating upwardly from the upper ends thereof. Sheaves 29 are mounted on the upper ends of respective plungers 28, and sheaves 31 are mounted on respective arms 19 adjacent the lower ends thereof. The cables 25 extend downwardly from respective outer sheaves 23 to respective sheaves 31 over which they are trained, and thereafter they are trained over respective sheaves 29, and then are secured to respective arms 19 adjacent the lower ends thereof as designated at 32.

The introduction of fluid pressure into the cylinders 27 effects upward movement of the plungers 28 and the sheaves 29 thereon, and this upward movement of the sheaves 29 effects a multiplied lineal movement of the cables 25 to lift the beam 11, the weight of the beam effecting downward movement thereof upon release of the pressure in the cylinders.

An arm 33 is pivotally mounted on the shaft 22 between the inner sheaves 23 and extends downwardly therefrom between the channel members 13 of the beam 11. The arm 33 is confined forwardly and rearwardly with respect to the beam 11 adjacent its front end by a member 34, by means of which the scoop 12 is secured on the beam, engaging the front face of this arm and blocks 35 secured on respective channel members 13 of the beam and engaging the rear face of this arm. See Figures 3 and 4. The arm 33 slidably engages against the inner surfaces of the channel members 13 to resist side thrust of the beam adjacent the front end thereof, and the surfaces of the member 34 and the blocks 35 which engage the arm 33 are convex in shape, as designated at 36, and are arranged so that the arm 33 is engaged with the beam for vertical and longitudinal swinging movement of the beam with respect to the arms 19 for the vertical and longitudinal movement of the beam.

Mounted for sliding movement on respective bearing members 14 in front of the bearing members 15 is a second pair of bearing members 37, and mounted for sliding movement on respective bearing members 14 at the rear of the bearing members 15 is a third pair of bearing members 38. Securing the bearing members 37 and 38 engaged with respective bearing members 14 in spaced relation is a pair of rods 39 which are fixed at respective ends thereof with respective bearing members 37 and 38. A pair of links 41 are pivotally connected at opposite ends thereof with respective arms 19 intermediate the ends thereof and with respective bearing members 37 whereby pivotal movement of the arms 19 is controlled by the bearing members 37 and 38 in their movement along the bearings 14.

Disposed in parallelism with and lying above respective bearing members 14 at the rear ends thereof and secured with the turntable 5 is a pair of hydraulic cylinders 42, hereinafter referred to as the out cylinders, the plungers 43 of which operate forwardly therefrom and are secured to respective bearing members 37 for operating them and the bearing members 38 forwardly along the bearing member 14. See Figures 1, 2, 3 and 7.

Disposed in parallelism with and lying below respective bearing members 14 at the front ends thereof and secured with the turntable 5 is another pair of hydraulic cylinders 44, hereinafter referred to as the in cylinders, the plungers 45 of which operate rearwardly therefrom and are secured to respective bearing members 38 for operating them and the bearing members 37 rearwardly along the bearings 14. See Figures 1, 3 and 7.

The bearing members 37 are each provided with a sheave 46, and a pair of chains 47 are trained over respective sheaves 46 and extend rearwardly therefrom, and each of these chains has its ends secured respectively on the respective cylinder 42, as designated at 48, and on the respective bearing member 15, as designated at 49. The bearing members 38 are each provided with a sheave 51, and a pair of chains 52 are trained over respective sheaves 50, and extend forwardly therefrom, and each of these chains has its ends secured respectively on the turntable 5, as designated at 53, and on the respective bearing member 15, as designated at 54. See Figures 1, 2 and 3.

By alternating fluid pressure in the out cylinders 42 and the in cylinders 44 the bearing members 37 and 38 secured with each other by the rods 39, as hereinbefore described, are reciprocated along the bearing members 14. This movement of the bearing members 37 and 38 is transmitted to the bearing members 15 in a greater magnitude through the chains 47 and 52 cooperating with the sheaves 46 and 51 in an obvious manner, the bearing members 15 receiving twice the movement that the bearing members 37 and 38 receive. The bearing members 37 and 38 are spaced sufficiently along the bearing members 14 to accommodate the greater movement of the bearing members 15, as will be observed in Figures 1 and 2. The beam 11 being secured with the bearings 15 is moved therewith longitudinally.

It will be observed that the front end of the beam 11 is suspended from the arms 19 for longitudinal swinging movement with respect thereto and that the rear end of the beam is carried for horizontal longitudinal and vertical pivotal movement. As the beam is moved forwardly from the position shown in Figure 1, to the position shown in Figure 2, by fluid pressure in the out cylinders 42, forward movement of the arms 19 is effected by the bearing members 37 through the links 41, in synchronism with and of lesser magnitude than the movement of the beam, this difference in movement being accommodated by the beam taking a longitudinal swinging movement with respect to the arms 19. Rearward movement of the beam 11, by fluid pressure in the in cylinders 44, from the position shown in Figure 2 to the position shown in Figure 1 is accomplished in the same manner, it being obvious that the parts operate rearwardly in the same manner.

It will be observed that by reason of the construction of the mechanism carrying the beam 11 its necessary length is relatively short as compared with the stroke and supported length thereof, thereby resulting in a correspondingly short length required for longitudinal operation of the beam. It will be further observed that the construction affords a uniform supported length of the beam throughout its stroke, that side thrust is adequately provided for and that the construction is adapted for a power shovel involving a centrally disposed holding jack. It will also be observed that the areal or longitudinal swinging movement of the beam with respect to the arms 19 acts in a counteracting manner with respect to arcal movement of these arms with a view toward effecting a substantially longitudinal movement of the beam.

The scoop 12 is provided with an ejector plate 55 movable longitudinally thereof for ejecting material from the scoop, and manually controlled actuation of the ejector plate is effected by a mechanism generally indicated at 56, see Figure 2, carried with the scoop immediately, to the rear thereof, it being unnecessary to describe the mechanism for the present purposes.

The hydraulic system for controlling the various movements of the hydraulically operated parts will now be briefly described. The pump 7, driven by the motor 6, serves to effect pressure in the system. The connections from this pump to the cylinders 27, 42 and 44 are effected through platform valves, generally indicated at 57, which are mounted on the turntable forwardly and on the side of the beam structure opposite that on which the pump 7 and motor 6 are disposed. See Figure 2.

These platform valves are manually controlled in a manner unnecessary to be described, and are employed to apply fluid pressure to and release fluid pressure from the lifting cylinders 27 for vertically operating the beam 11 and to alternately apply fluid pressure to and release fluid pressure from the out cylinders 42 and the in cylinders 44.

To effect this the following connections are employed. See particularly Figure 9. A high pressure pipe 58 leads from the outlet of the pump 7 to the platform valves 57 and a return pipe 59 leads from the platform valves to a tank 61, mounted on the turntable 5 rearwardly on the same side of the beam structure as the platform valves are disposed, the pump 7 drawing fluid from the tank through a pipe 62. A branched pipe 63 leads from the platform valves to respective swivel joints 64 on the outer ends of respective studs 21, and passages 65 in the studs 21 lead from respective swivel joints to bored extensions 66 on the lower ends of the cylinders 27 passing through apertures in the lower hubs of the arms 19 and screwthreaded into respective studs 21. See Figures 5 and 6.

A second branched pipe 67 leads from the platform valves to the out cylinders 42, and a third branched pipe 68 leads from the platform valves to the in cylinders 44.

The platform valves are so arranged that when fluid pressure is applied to the out cylinders 42, pressure in the in cylinders 44 is released, and, vice versa, when fluid pressure is applied to the in cylinders, pressure in the out cylinders is released.

Pressure in the jack cylinders 3 is controlled by manually manipulated jack valves 69 communicating with the jack cylinder and connected with the high pressure pipe 58 by a pipe 70 and with the pipe 62 by a pipe 71.

While I have shown herein and described one form of my invention, I do not wish to be limited to the precise details of construction or arrangements of parts herein shown and described except as specifically limited in the appended claims.

I claim as my invention:

1. In a power shovel, the combination of a frame, a scoop carrying beam, means carrying said beam on said frame for longitudinal movement including beam elevating means movable with respect to said frame and said beam longitudinally of the beam, and means for effecting said movement of said elevating means with corresponding longitudinal movement of said beam.

2. In a power shovel, the combination of a turntable frame, a scoop carrying beam, means carrying said beam on said frame for longitudinal movement including a support member mounted on said frame for movement in a path longitudinally of said beam and means reacting on said support member for vertically adjusting the beam and adapted to permit longitudinal movement of the beam with respect to the support member, and increasing movement means for effecting said movement of said support member with a greater corresponding longitudinal movement of said beam.

3. In a power shovel, the combination with a frame, a scoop carrying beam, means carrying said beam on said frame for longitudinal movement including an arm pivotally mounted on said frame for movement in a vertical plane longitudinally of said beam and means operating between said arm and said beam for vertically adjusting the beam and adapted to permit longitudinal movement of the beam with respect to the arm, and means for effecting pivotal movement of said arm in synchronism with and of lesser magnitude than corresponding longitudinal movement of said beam.

4. In a power shovel, the combination of a turntable frame, a beam, a scoop on the front end of said beam, means carrying said beam at a rearward point thereon on said frame for longitudinal and vertical pivotal movement, an arm pivotally mounted at its lower end forwardly on said frame for movement in a vertical plane longitudinally of said beam, means depending from the upper end of said arm and engaged with said beam forwardly thereon for vertically adjusting the beam and adapted to permit longitudinal swinging movement of the beam, and means for effecting pivotal movement of said arm with a greater corresponding longitudinal movement of said beam.

5. In a power shovel, the combination of a frame, a beam, a scoop on the front end of said beam, means carrying said beam at the rear end thereof on said frame for horizontal longitudinal and vertical pivotal movement, an arm pivotally mounted at its lower end forwardly on said frame for movement in a vertical plane longitudinally of said beam, a sheave on the upper end of said arm, a cable trained over said sheave and secured to said beam at a forward point thereon for vertically adjusting said beam, means for operating said cable, a second arm pivotally mounted on the upper end of said first mentioned arm for movement in a vertical plane longitudinally of said beam and slidably and pivotally engaged with the beam at a forward point on the beam to resist side thrust on the beam and to permit longitudinal swinging movement of the beam, and means for effecting pivotal movement of said first mentioned arm in synchronism with and of lesser magnitude than corresponding longitudinal movement of said beam.

6. In a power shovel, the combination of a frame, a scoop carrying beam, means carrying said beam on said frame for longitudinal movement including a pair of arms on respective sides of said beam and pivotally mounted on said frame in coaxial relation for movement in vertical planes longitudinally of said beam, means operating between said arms and said beam for vertically adjusting the beam and adapted to permit longitudinal movement of the beam with respect to the arms, and means for effecting pivotal movement of said arms in unison and with a greater corresponding longitudinal movement of said beam.

7. In a power shovel, the combination of a turntable frame, a beam, a scoop on the front end of said beam, means carrying said beam at a rearward point thereon on said frame for longitudinal and vertical pivotal movement, a pair of arms on respective sides of said beam and pivotally mounted at their lower ends on said frame in coaxial relation for movement in vertical planes longitudinally of said beam, means depending from the upper ends of said arms and engaged with said beam forwardly thereon for vertically adjusting the beam and adapted to permit longitudinal swinging movement of the beam, and means for effecting pivotal movement of said arms in unison and in synchronism with and of less magnitude than corresponding longitudinal movement of said beam.

8. In a power shovel, the combination of a turntable frame, a beam, a scoop on the front end of said beam, means carrying the rear end of said beam on the frame for horizontal longitudinal and vertical pivotal movement, a pair of extensions on said frame and projecting forwardly therefrom at respective sides of said beam, a pair of arms on respective sides of said beam and pivotally mounted at their lower ends on said extension for movement in vertical planes longitudinally of said beam, a transverse shaft connecting the upper ends of said arms, sheaves on said shaft at respective arms, cables trained over respective sheaves and connected with said beam adjacent its front end for vertically adjusting the beam, fluid pressure means carried with respective arms for operating respective cables, a third arm mounted on said shaft intermediate said pair of arms for pivotal movement and slidably and pivotally engaged with said beam adjacent the front end of the beam to resist side thrust on the beam and to permit longitudinal swinging movement of the beam, and means for effecting pivotal movement of said pair of arms in synchronism with and of lesser magnitude than corresponding longitudinal movement of said beam.

9. In a power shovel, the combination of a frame, a scoop carrying beam, a horizontal bearing member on said frame extending longitudinally at said beam, a second bearing member movably mounted on said first mentioned bearing member and carrying the rear end of said beam for vertical pivotal movement, beam elevating means including an arm pivotally mounted forwardly on said frame for movement in a vertical plane longitudinally of the beam and with respect to which the beam is longitudinally movable, a third bearing member movably mounted on said first mentioned bearing member for operating said arm, and means for operating said third bearing member with a greater corresponding movement of said second bearing member.

10. In a power shovel, the combination of a turntable frame, a scoop carrying beam, a horizontal bearing member on said frame extending longitudinally of said beam, a second bearing member movably mounted on said first mentioned bearing member and carrying the rear end of said beam for vertical pivotal movement, beam elevating means including an arm pivotally mounted forwardly on said frame for movement in a vertical plane longitudinally of the beam and with respect to which the beam is longitudinally movable, a third bearing member comprising spaced portions movably mounted on said first mentioned bearing member for movement therealong respectively in front of and at the rear of said second bearing member, a link pivotally connected with said arm and the forward portion of said third bearing member for operating the arm, two oppositely acting fluid pressure devices arranged longitudinally of said first mentioned bearing member and reacting on said frame, the forward acting fluid pressure device being connected with the forward portion and the other fluid pressure device being connected with the rear portion of said third bearing member, a pair of revoluble bight forming members mounted on respective portions of said third bearing member, and a pair of flexible tension members trained over respective bight forming members and extending oppositely therefrom and each having its ends secured respectively to said second bearing member and with said frame.

11. In a power shovel, the combination with a vertical holding jack and a turntable frame angularly movable thereabout, a scoop carrying beam comprising a pair of laterally spaced longitudinal members adapted for passing on respective sides of said jack, a pair of horizontal parallel bearing members on said frame extending longitudinally of said beam on respective sides of said jack, a second pair of bearing members movably mounted on respective of said first mentioned and carrying the rear ends of respective beam members for vertical pivotal movement of the beam, beam elevating means including a pair of arms on respective sides of said beam and pivotally mounted forwardly on said frame in coaxial relation for movement in vertical planes longitudinally of said beam and with respect to which said beam is longitudinally movable, a third pair of bearing members movably mounted on respective of said first mentioned bearing members, a pair of links pivotally connected with respective of said arms and respective of said third bearing members for operating the arms, increasing movement devices on respective sides of said jack for effecting movement of respective of said second bearing members in synchronism with and of greater magnitude than corresponding movement of respective of said third bearing members, and fluid pressure devices disposed on respective sides of said jack for actuating respective of said third bearing members.

Signed at Chicago, in the county of Cook and State of Illinois, this 28th day of April, A. D. 1926.

WILLIAM W. SLOANE.